United States Patent [19]
Menicanti et al.

[11] 3,767,021
[45] Oct. 23, 1973

[54] CAM ACTUATED SHIFT DEVICE WITH CONTINUOUSLY OPERATED INTERMEDIATE LEVER FOR TYPE-BAR TYPEWRITER

[75] Inventors: Adriano Menicanti, Ivrea; Oberto Giacomo, Samone, both of Italy

[73] Assignee: Ing. C. Olivetti & C. S.p.A., Ivrea (Torino), Italy

[22] Filed: July 28, 1970

[21] Appl. No.: 58,871

[30] Foreign Application Priority Data
Aug. 20, 1969 Italy .............................. 53047 A/69

[52] U.S. Cl. ................................................ 197/74
[51] Int. Cl. ................................................ B41j 7/50
[58] Field of Search ................... 197/71, 72, 73, 74, 197/75, 76, 77, 78, 79, 80, 81, 41

[56] References Cited
UNITED STATES PATENTS
2,158,066   5/1939   Evans ................................ 197/73 X
2,338,122   1/1944   Madsen .............................. 197/71
3,228,511   1/1966   Meinherz ........................... 197/74

FOREIGN PATENTS OR APPLICATIONS
1,129,805   10/1968   Great Britain ....................... 197/72

Primary Examiner—Ernest T. Wright, Jr.
Attorney—Birch, Swindler, McKie and Beckett

[57] ABSTRACT

A shift device for shifting the type-bar support between the lower-case letters and the capital letters in an electric typewriter. A linkage actuated by the typewriter shift key engages a continuously oscillating means which moves the type-bar support from the lower-case letter position to the capital letter position when the shift key is depressed, and from the capital letter position to the lower-case letter position when the shift key is released.

7 Claims, 1 Drawing Figure

PATENTED OCT 23 1973
3,767,021
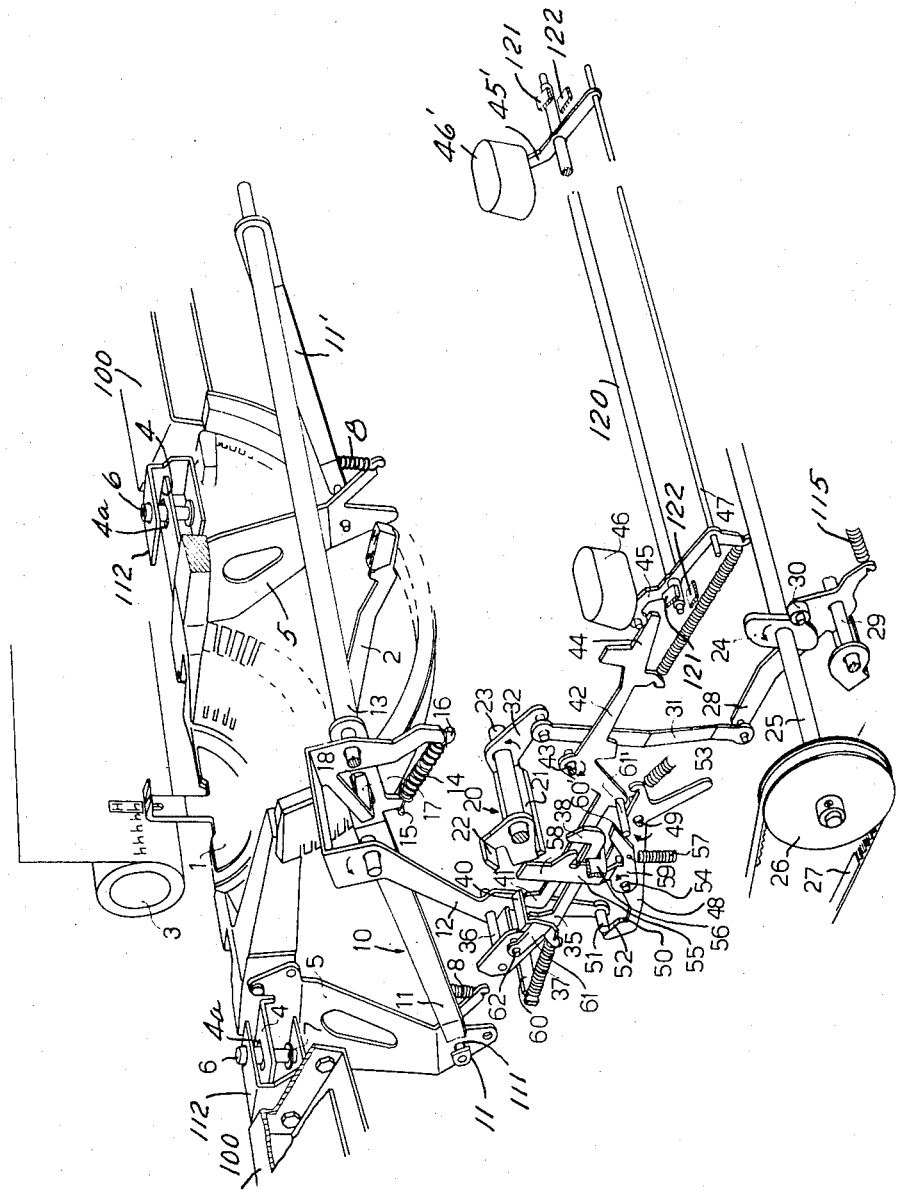
INVENTOR
Adriano Menicanti
Giacomo Oberta
BY Busch, Swindler,
McKie & Beckett
ATTORNEY

CAM ACTUATED SHIFT DEVICE WITH CONTINUOUSLY OPERATED INTERMEDIATE LEVER FOR TYPE-BAR TYPEWRITER

BACKGROUND OF THE INVENTION

1. Field of the Invention

This invention relates to a device for shifting from lower-case to capital letters in a type-bar electric typewriter.

2. Discussion of the Prior Art

The shift device of an electric typewriter permits shifting between capital or upper-case letters and small or lower-case letters by vertical displacement of the type-bar support plate, which is actuated under the control of the shift key. In a conventional typewriter, this device normally comprises a shift cam rotatably mounted on the main shaft of the machine, which shaft also mounts other cams actuating the various mechanisms of the typewriter, and which can be engaged with the shaft by means of a clutch. This cam controls the vertical movement of the typebar support plate, through a suitable lever assembly, bringing the latter from the position of rest, corresponding to the lower-case letters, to a lower position relative to the rest position, corresponding to the capital-letters.

Upon depression of the shift key, the aforementioned clutch is engaged by the action of a suitable linkage and thus the shift cam is caused to rotate and is brought to the capital-letter position, where it remains during the whole period of time during which the shift key is held depressed. It is restored to the lower-case letter position as soon as the shift key is released. At this point, the type-bar support plate can return to its position of rest.

This shift device, although being generally satisfactory, is rather complex and of considerable overall dimensions, and therefore is not suited for use in electric typewriters of small size, such as portable electric typewriters.

SUMMARY OF THE INVENTION

The object of the present invention is to avoid the above-mentioned disadvantage and to provide a shift device for type-bar electric typewriters which is of rather simple structure and reduced size, particularly suited for use in portable electric typewriters.

In accordance with the present invention, there is provided a type-bar electric typewriter with a shift device, wherein shifting from the lower-case letter position to the capital-letter position is accomplished by depressing a shift key which causes lowering of a type-bar support plate, this plate remaining in the capital-letter position during the whole period of time in which the shift key is kept depressed and returning to the lower-case letter position when the key is released. This action is motivated by a member which continuously oscillates during operation of the typewriter and which is arranged to actuate, upon depression of the shift key, a shifting mechanism for the type-bar support plate, so as to bring the latter into the capital-letter position. Locking means automatically lock the shifting mechanism in its capital-letter position when this position is reached. The oscillatory member is further arranged to actuate, when the shift key is released, disengagement means for the locking means, so as to release the shifting mechanism of the type-bar support plate for return to the lower-case letter position.

DESCRIPTION OF THE DRAWING

For a better understanding of the present invention, one particular embodiment thereof will now be described, merely by way of example, with reference to the accompanying drawing which shows a perspective view of the device in its position of rest, wherein the type-bar support plate of the typewriter is in the upper or raised position, corresponding to the position of writing with lower-case letters.

DESCRIPTION OF A PREFERRED EMBODIMENT

With reference to the drawing, a type-bar support plate 1 of a type-bar electric typewriter can be displaced vertically on the machine frame 100 and take two positions, i.e. an upper position (as shown in the drawing) and a lower position, in correspondence with which the type bars with types 2 write, on a platen or cylinder 3, lower-case and upper case or capital letters respectively. During the vertical displacement of the plate 1, it is guided at each of its sides by a stationary pin 6 mounted on a lug 112 of a machine frame 100 and engaged in a corresponding opening 4a provided in an ear 4 of a bracket 5, attached to plate 1 and by arms 11 and 11' forming part of an intermediate number or shift frame 10 and pivotally attached to the bottom of the bracket 5 by a pin 111. The ear 4 of each bracket 5, by abutting lug 112 and a ring 7 carried by the pin 6, defines the upper and lower positions of the type-bar support plate 1. This plate 1 is normally held, by the action of coil springs 8, in its raised, or rest position.

The shift frame 10 comprises, besides the arms 11 and 11', a second arm 12 which can rotate, with the arm 11, about a shaft 13 carried by the frame 100 of the machine. The arms 11 and 12 are resiliently connected to one another by means of a coil spring 14 which is stretched between a pair of projections 15 and 16 of the arms 11 and respectively. A lug 17 of the arm 12 engages with a predetermined clearance an opening 18 in the arm 11. By virtue of the interconnection between the arms 11 and 12, if the arm 12 is caused to rotate in the direction of the arrow, the arm 11 will rotate as well. The type-bar support plate 1 will then be resiliently pulled down into the capital-letter position by the bias of the coil spring 14 stretched between the projections 15 and 16. In fact, the arm 12, to reach this position will rotate in the direction indicated by the arrow through an angle which is greater than the angle followed by the shift frame 10 in its pivotal movement to reach the same position, thereby taking up the backlash existing between the lug 17 and the hole 18 and increasing the tension of the spring 14.

A reciprocating member in the form of a bridge 20, essentially comprising a first extension 21 and a second extension 22, is caused to pivot about a shaft 23 with an oscillating movement, by means of a cam 24 integral with a shaft 25 which is driven, for instance, by a conventional electric motor (not shown) through a pulley 26 and a transmission belt 27. The connection between the cam 24 and the bridge 20 is accomplished by means of a crank 28 which is pivotally mounted on a shaft 29 integral with the machine frame 100. Crank 28 is provided with a cam follower 30, and is connected by a connecting rod 31 to a crank 32 of the bridge 20. Therefore, rotation of the cam 24 in the counterclockwise direction will cause bridge 20 to oscillate. A spring 115 urges crank 28 in the counterclockwise direction.

An engagement pawl or lever 35 is pivotally mounted, by means of a pin 36, on the arm 12 of the shift frame 10 and is held against a stop 56 in its rest position, as shown in the drawing, by a coil spring 37 stretched between a lug 60 of the arm 12 and a lever 61 pivotally mounted on the lever 35 at pin 62. The engagement lever 35 is provided, at one end, with an upstanding detent or hook 38 which can engage the first extension 21 of the oscillating bridge 20 when, as will be explained below, the hook 38 is brought up into the path of the oscillating extension 21.

A lug 40 of the lever 61 bears on the end 41 of a control lever 42 pivotally mounted on the machine frame 100 by a pin 43. The opposite end 44 of control lever 42 cooperates with a shank 45 of a shift key 46, hinged on a bar 47 attached to a machine frame 100. Customarily, a pair of shift keys 46 and 46' having shanks 45 and 45', respectively, are used with a rod 120 connecting the two shanks 45 and 45'. Stops 121 and 122, engaging rod 120, are provided to limit the movement of shanks 45 and 45'. Shank 45 is directly engageable with end 44 of control lever 42 to operate the shift linkage. Therefore, upon depression of this key 46, the control lever 42 will be caused to rotate in the direction shown in the drawing, with consequent lifting of its end 41; this end 41 will lift, in turn, the extension 40 of the lever 61. In this manner, a force will be applied to the pin 62 of the lever 61 through the resilient connection provided by the spring 37, this force tending to pivot the engagement lever 35 upwards, so as to bring the hook 38 into the path of movement of the extension 21 of the oscillating bridge 20.

A locking lever 48 is pivoted on the machine frame 100 by means of a pin 49 and carries, at one of its ends, a detent 50 adapted to cooperate with a pin 51 protruding from the lower end of the arm 12 of the shift frame 10. In the upper position of the shift frame 10, an inclined surface 52 of the locking lever 48 is biased against the end pin 51 by the action of a coil spring 53. When, upon movement of the shift frame 10 in the direction of the arrow to the lower position, the type-bar support plate 1 is brought — in a manner to be explained below — from the upper position, as shown in the drawing, to the lower position, the pin 51 of the arm 12 will be caught by the detent 50 of the locking lever 48, thereby locking the shift frame 10 and preventing return of the type-bar support plate 1 to the upper position.

On a pin 54, carried by the locking lever 48, is pivotally mounted a pawl or bell-crank lever 55 which, in the upper position of the shift frame 10, is biased against the stop 56 by a coil spring 57. The bell-crank lever 55 has a first, upstanding arm 58 and a second arm 59 provided with an inclined surface 60' which bears against a pin 61' integral with the control lever 42.

The position and the shape of the first arm 58 are so chosen that the end of first arm 58 will move into the path of the oscillating second extension 22 of the bridge 20 when the locking lever 48 is in the locked position, i.e. when the locking lever 48 has been rotated in the direction of the arrow shown in the drawing, with the pin 51 abutting against the detent 50, and when the control lever 42 has returned to the position of rest. In this configuration, under the action of the vertical downward push exerted by the extension 22 of the bridge 20 on the arm 58 of the bell-crank lever 55, the locking lever 48 will be caused to rotate in the direction opposite to that of the arrow, thereby releasing the detent 50 from the end pin 51 of the arm 12 of the shift frame 10.

When the locking lever 48 is in the locked position mentioned above, the control lever 42 remains pivoted in the direction of the arrow, so long as the key 46 remains depressed. The arm 58 will not move into the path of the oscillating second extension 22, since the pin 61' of the control lever 42, by its action on the inclined surface 60' of the second arm 59 of the bell-crank lever 55, will cause bell-crank lever 55 to rotate in the direction of the arrow shown in the drawing.

The operation of the shift device described above is as follows:

When the typewriter is energized, the cam 24 is caused to rotate continuously by the electric motor (also not shown). Note that no clutch is interposed in the transmission, which includes shaft 25, pulley 26, and belt 27, connecting the cam 24 with the electric motor of the typewriter. The bridge 20 will thus oscillate continuously about the shaft 23 with a predetermined amplitude. While support plate 1 is in the upper position neither of the extensions 21 and 22 of the bridge 20 will interfere with other parts of the device, inasmuch as the engagement lever 35 is in the position shown in the drawing, i.e. in a position wherein the hook 38 is out of the path of the first extension 21. The end of the first arm 58 of the bell-crank lever 55 is held in its lowermost position, corresponding to that shown in the drawing, by the locking lever 48 which, being in its released position, is also lowered, as shown, and therefore is out of the path of movement of the second extension 22 of the bridge 20.

Upon depression of the shift key 46, the end of the shank 45, by pushing on the end 44 of the control lever 42, will cause the control lever 42 to rotate in the direction of the arrow, whereby the end 41 will move upwardly. This end 41 will, in turn, displace lug 40 of lever 61 upward. Due to this rotation, the hook 38 will be brought in the path of movement of the first extension 21 of the bridge 20, and this extension 21 will engage hook 38, pulling the lever 35 forward. Because of the interconnection of the lever 35 with the arm 12, shift frame 10 will rotate in the direction of the arrow shown in the drawing, thus pulling the type-bar support plate 1 down into the lower or capital-letter position.

During the rotation of the shift frame 10, the pin 51 rides down the inclined surface 52 of the locking lever 48 until it is caught by the detent 50 of the lever 48, thus firmly locking the support plate 1 in the capital-letter position. Since the control lever 42 has been rotated in the direction of the arrow, the pin 61' of the same lever 42, by acting on the inclined surface 60', will have pushed the bell-crank lever 55 in the direction of the arrow shown in the drawing, thereby bringing the end of the arm 58 out of the path of movement of the second extension 22 of the bridge 20. Having been thus locked, the device will remain in the capital-letter position and the bridge 20 will be free to oscillate, since the extensions 21 and 22 will not interfere with any part of the device.

As soon as the shift key 46 is released, the control lever 42 will be free to rotate in the direction opposite to that of the arrow shown in the drawing and, therefore, the pin 61' will allow the arm 58 to come into that position in which the end of said arm 58 moves into the path of the second extension 22 of the oscillating bridge 20. In such configuration, during the oscillation of the bridge 20, this extension 22 will therefore push the bell-crank lever 55 downwards, and with it the locking lever 48, thereby releasing the detent 50 of the lever 48 from the pin 51 of the arm 12 of the shift frame 10. In this manner, the frame 10 will be restored to its upper or rest position under the action of the coil springs 8, which bias the type-bar support plate 1 upwards.

We claim:

1. A type-bar electric typewriter having a type-bar support movable between a lower-case position and an upper-case position, means movably mounting said type-bar support, spring means normally urging said type-bar support to said lower-case position, and a manually depressible shift key for causing movement of said type-bar support from said lower-case position to said upper-case position against the urging of said spring means, having an improvement comprising:

a power-driven continuously rotatable cam, an oscillatable member operatively engaged with said cam and driven thereby in continuous oscillatable motion in first and second directions, engagement means connected to said type-bar support for moving said type-bar support, said engagement means being engageable with said oscillatable member moving in said first direction to move said type-bar support from said lower-case position to said upper-case position, said engagement means being operatively connected to said shift key and operated into engagement with said oscillatable member by depressing said shift key, locking means operatively connected to said shift key and operated thereby to lock said type-bar support in said upper-case position so long as said shift key is depressed, and releasing means operatively connected to and operated by said shift key and engageable with said oscillatable member moving in said second direction, said shift key upon being released operating said releasing means into engagement with said oscillatable member to release said type-bar support, whereby said spring means returns said type-bar support to said lower-case position.

2. An electric typewriter according to claim 1 including a machine frame wherein said oscillatable member includes a first extension, and said engagement means comprises an intermediate means pivotally mounted on said machine frame and having a first arm connected to said type-bar support and a second arm pivotally mounting a pawl, and a shift key lever operated by said shift key to pivot said pawl into engagement with said first extension upon said shift key being depressed, whereby said intermediate means is pivoted to move said type-bar support to said upper-case position.

3. An electric typewriter according to claim 2 wherein said intermediate means further comprises a locking element and said locking means comprises a locking lever pivotally mounted on said machine frame and being biased toward said locking element for engaging and holding said element when said type-bar support assumes said upper-case position.

4. A typewriter according to claim 3 wherein said releasing means comprises a second extension carried by said oscillatable member and a bell-crank lever pivotally mounted on said locking lever and controlled by said shift key lever, said bell-crank lever having a first leg engageable by said second extension of said oscillatable member when said shift key is released to drive said locking lever out of engagement with said locking element.

5. An electric typewriter according to claim 4 wherein said bell-crank lever has a second leg provided with a cam portion, said shift key lever operating a locking member cooperating with said cam portion to move said first leg out of the path of said second extension when said shift key is depressed and to hold said first leg out of the path of said second extension so long as said shift key is held depressed.

6. An electric typewriter according to claim 5 wherein said oscillatable member is pivoted on said machine frame, and said first extension and said second extension are so located as to act upon said pawl and said first leg respectively in directions which are substantially at right angles to one another.

7. A type-bar electric typewriter comprising:

a machine frame, a type-bar support mounted on said frame and movable between a lower-case position and an upper-case position, means biasing said type-bar support to said lower-case position, a driven continuously rotatable cam means, an oscillatable member engaging said cam means and driven in continuous oscillation in first and second directions thereby, type-bar support operating means connected to said type-bar support for moving said type-bar support between said lower-case and upper-case positions, said operating means including engagement means movable from a first position into the path of said oscillatable member moving in said first direction to be engaged by said oscillatable member and moved thereby in said first direction to a second position to move said type-bar support from said lower-case position to said upper-case position, a shift key pivotally mounted on said machine frame, means for moving said engagement means into the path of said oscillatable member, said means for moving said engagement means being operatively connected to and operated by said shift key when said shift key is depressed, locking means engageable with said engagement means for locking said engagement means in said second position, said locking means being operatively connected to and operated by said shift key when said shift key is depressed, release means engageable with said locking means for unlocking said locking means to allow said engagement means to return to said first position and said type-bar support to said lower-case position, said release means being movable into the path of said oscillatable member moving in said first direction to be engaged by said oscillatable member to be moved thereby to a release position, and means for moving said release means into the path of said oscillatable member moving in said first direction operatively connected to and operated by said shift key when said shift key is released from being depressed.

* * * * *